(12) United States Patent
Lu et al.

(10) Patent No.: US 10,577,525 B2
(45) Date of Patent: Mar. 3, 2020

(54) COMPOSITE ABRASIVE WITH HARD CORE AND SOFT SHELL, MANUFACTURING METHOD AND APPLICATION METHOD

(71) Applicant: HUAQIAO UNIVERSITY, Quanzhou (CN)

(72) Inventors: Jing Lu, Quanzhou (CN); Xipeng Xu, Quanzhou (CN); Dayu Zhang, Quanzhou (CN); Yongchao Xu, Quanzhou (CN); Qiufa Luo, Quanzhou (CN)

(73) Assignee: HUAQIAO UNIVERSITY, Quanzhou (CN)

( * ) Notice: Subject to any disclaimer, the term of this patent is extended or adjusted under 35 U.S.C. 154(b) by 432 days.

(21) Appl. No.: 15/342,851

(22) Filed: Nov. 3, 2016

(65) Prior Publication Data

US 2017/0121580 A1    May 4, 2017

(30) Foreign Application Priority Data

Nov. 4, 2015   (CN) .......................... 2015 1 0743043

(51) Int. Cl.
*C09K 3/14*   (2006.01)
*C04B 35/628*   (2006.01)
(Continued)

(52) U.S. Cl.
CPC ............ *C09K 3/1436* (2013.01); *B24B 7/228* (2013.01); *C04B 35/1115* (2013.01); *C04B 35/563* (2013.01); *C04B 35/565* (2013.01); *C04B 35/583* (2013.01); *C04B 35/6281* (2013.01); *C04B 35/62805* (2013.01); *C04B 35/62815* (2013.01); *C04B 35/62826* (2013.01); *C04B 35/62886* (2013.01); *C04B 35/62897* (2013.01); *C09K 3/1445* (2013.01); *C04B 2235/3206* (2013.01); *C04B 2235/3229* (2013.01); *C04B 2235/3293* (2013.01); *C04B 2235/443* (2013.01); *C04B 2235/444* (2013.01);
(Continued)

(58) Field of Classification Search
None
See application file for complete search history.

(56) References Cited

U.S. PATENT DOCUMENTS 5,179,054 A * 1/1993 Schipper .................. B01J 33/00
  502/65
6,200,718 B1 * 3/2001 Takasaki ............ G03G 9/09314
  399/297

(Continued)

*Primary Examiner* — Colleen P Dunn
*Assistant Examiner* — Ross J Christie
(74) *Attorney, Agent, or Firm* — Cooper Legal Group, LLC

(57) ABSTRACT

Disclosed is a composite abrasive with hard core and soft shell, comprising hard abrasive core with grain diameter in a range of 0.1~1 μm and a soft oxide shell with thickness in a range of 5~100 nm, the grain size of the oxide of the soft oxide shell is in a range of 5~20 nm, the composite abrasive is obtained from aqueous solution of oxide inorganic salt precursor and the hard abrasive by dispersing, constant temperature reflux hydrolyzing, solid-liquid separating, washing and drying. The component abrasive with hard core and soft shell of the present invention can improve the manufacturing efficiency and the surface quality during the ultraprecise manufacturing of the sapphire substrate.

16 Claims, 3 Drawing Sheets

(51) Int. Cl.
*C04B 35/583* (2006.01)
*C04B 35/111* (2006.01)
*C04B 35/565* (2006.01)
*C04B 35/563* (2006.01)
*B24B 7/22* (2006.01)

(52) U.S. Cl.
CPC .................. *C04B 2235/448* (2013.01); *C04B 2235/5445* (2013.01); *C04B 2235/5454* (2013.01)

(56) References Cited

U.S. PATENT DOCUMENTS

| | | | | |
|---|---|---|---|---|
| 2010/0330132 | A1* | 12/2010 | Inokuchi | A61K 8/02 424/401 |
| 2011/0301279 | A1* | 12/2011 | Xue | C09K 21/12 524/508 |
| 2012/0132108 | A1* | 5/2012 | Ishihara | B82Y 30/00 106/287.1 |
| 2014/0370313 | A1* | 12/2014 | Thomas | C25D 5/54 428/469 |

* cited by examiner

COMPOSITE ABRASIVE WITH HARD CORE AND SOFT SHELL, MANUFACTURING METHOD AND APPLICATION METHOD

FIELD OF THE INVENTION

The present invention relates to an abrasive, especially to a composite abrasive with hard core and soft shell, manufacturing method and application method.

BACKGROUND OF THE INVENTION

Monocrystal sapphire has well photoelectric property and chemical stability, high abrasive resistance, high melting point and high hardness, it is widely used in photoelectron, communication and national defense fields. With the development of the high and new technology, the processing requirement to the sapphire is enhanced, it not only requires the surface machining a sub-nanometer precision, non-residual stress and non-damage on the surface and the sub-surface, but also needs consideration to the manufacturing efficiency and cost. Existing ultraprecise manufacturing of the sapphire wafer is usually applied with chemico-mechanical polishing, to achieve full planarization of the sapphire substrate. Although the CMP technology is widely used, as the monocrystal sapphire is classical hard brittle material, it has characteristics of high hardness, high brittleness and strong chemical inertness, this traditional wafer manufacturing method used in sapphire polishing comes out a lot problems like low material removal rate, bad surface quality, high manufacturing cost and pollution problem due to corrosive liquid.

SUMMARY OF THE INVENTION

The object of the present invention is to overcome the disadvantages of the existing known technology and to provide a composite abrasive with hard core and soft shell.

Another object of the present invention is to provide with manufacturing method of the composite abrasive with hard core and soft shell.

A third object of the present invention is to provide with application method of the composite abrasive with hard core and soft shell.

The technical proposal of the present invention is that:

A composite abrasive with hard core and soft shell, comprising hard abrasive core with grain diameter in a range of 0.1~1 μm and a soft oxide shell with thickness in a range of 5~100 nm, the grain size of the oxide of the soft oxide shell is in a range of 5~20 nm, the composite abrasive is obtained from aqueous solution of oxide inorganic salt precursor and the hard abrasive by dispersing, constant temperature reflux hydrolyzing, solid-liquid separating, washing and drying.

The hard abrasive core comprises at least one kind selected from diamond, cBN, $B_4C$, SiC and $Al_2O_3$.

The oxide comprises at least one kind selected from $SnO_2$, $CeO_2$, MgO, FeO and $Fe_2O_3$.

The inorganic salt precursor comprises at least one kind selected from chlorine salt, nitrate and sulfate.

A manufacturing method of the composite abrasive with hard core and soft shell, comprising the steps:

(1) preparing aqueous solution of oxide inorganic salt precursor with concentration of 0.1~1 mol/L by solving the oxide inorganic salt precursor in deionized water;

(2) putting hard abrasive into the aqueous solution, the mass concentration of the hard abrasive in the aqueous solution is in a range of 1~10%;

(3) ultrasonic dispersing the material of step (2) for 10~15 minutes to obtain stable emulsion;

(4) the emulsion is reflux hydrolyzed in a constant temperature of 60~90° C. for 8~72 hours;

(5) the material of step (4) is solid-liquid separated, the solid is washed by distilled water and absolute ethyl alcohol;

(6) drying the solid of step (5) in 40~45° C. to obtain the composite abrasive with hard core and soft shell.

In step (5), the material of step (4) is vacuum filtered, the obtained solid is washed by distilled water for 5 times and washed by absolute ethyl alcohol for 3 times in turn.

In step (6), the drying period is 20~30 hours.

An application method of the composite abrasive with hard core and soft shell, the composite abrasive is applied in the ultraprecise polishing sapphire wafers.

The technical proposal of the present invention has advantages as follow:

1. The component abrasive with hard core and soft shell of the present invention can improve the manufacturing efficiency and the surface quality during the ultraprecise manufacturing of the sapphire substrate, the principle is that: under the machining stress of the hard abrasive, the contact portion of the soft oxide shell on the surface of the component abrasive and the wafer generates interfacial chemical reaction and forms a phase transition passivation layer due to the friction, the tissue of the passivation layer is softer than the sapphire that it is easy to remove, and it doesn't have residual stress and affected layer, therefore it can achieve a high efficiency, ultraprecise and non-damage manufacturing of sapphire wafer.
2. The manufacturing method of the present invention can achieve that the coating layer has controllable profile and thickness, it has simple manufacturing method and low cost that it is suitable for mass production.

DETAILED DESCRIPTION OF THE EMBODIMENTS

The present invention will be further described with the drawings and the embodiments.

Figure 1:
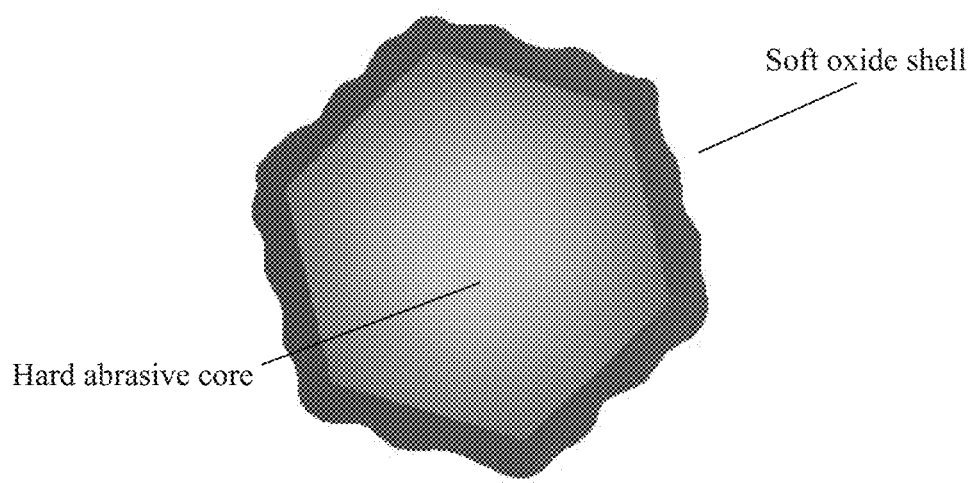
FIG. 1 illustrates a schematic diagram of the composite abrasive with hard core and soft shell of the present invention.
Figure 2:
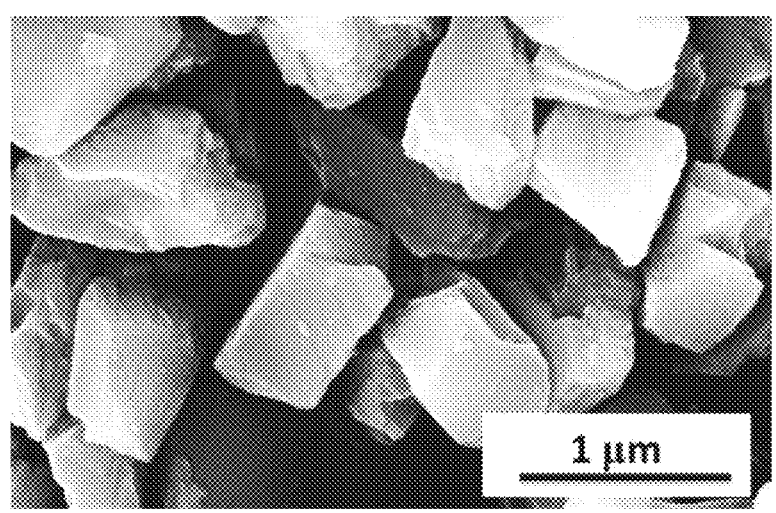
FIG. 2 illustrates a stereoscan photograph of the diamond abrasive of the first embodiment of the present invention.
Figure 3:
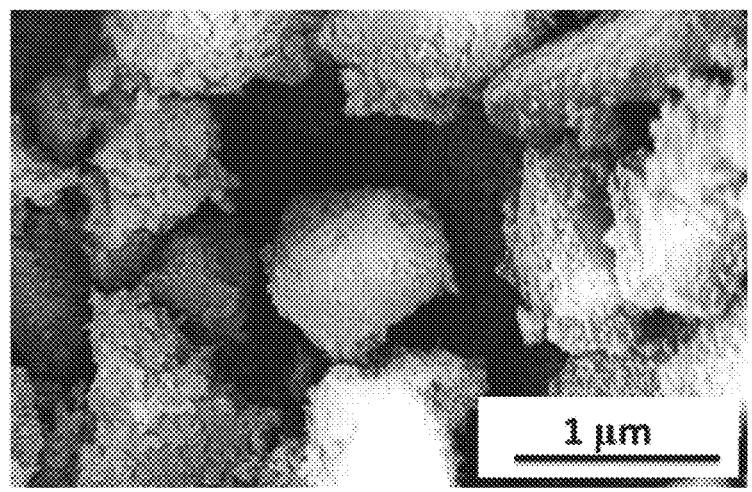
FIG. 3 illustrates a stereoscan photograph of the composite abrasive with hard core and soft shell of the first embodiment of the present invention.

The First Embodiment (1) preparing 300 mL of ferric oxide solution with concentration of 1 mol/L by solving ferric chloride in deionized water;

(2) putting 4.5 g of W1 diamond abrasive into the ferric oxide solution, as figured in FIG. 2;
(3) ultrasonic dispersing the material of step (2) for 10 minutes to obtain stable emulsion;
(4) the emulsion is reflux hydrolyzed in a constant temperature bath of 90° C. for 48 hours;
(5) the material of step (4) is vacuum filtered, the obtained solid is washed by distilled water for 5 times and washed by absolute ethyl alcohol for 3 times in turn.
(6) drying the solid of step (5) in 40° C. for 24 hours to obtain the composite abrasive with hard core and soft shell, as figured in FIG. 1 and FIG. 3, the composite abrasive comprising diamond abrasive core with grain diameter 1 μm and a soft ferric oxide shell with thickness about 100 nm, the grain size of the ferric oxide of the shell is about 10 nm.

Figure 4:
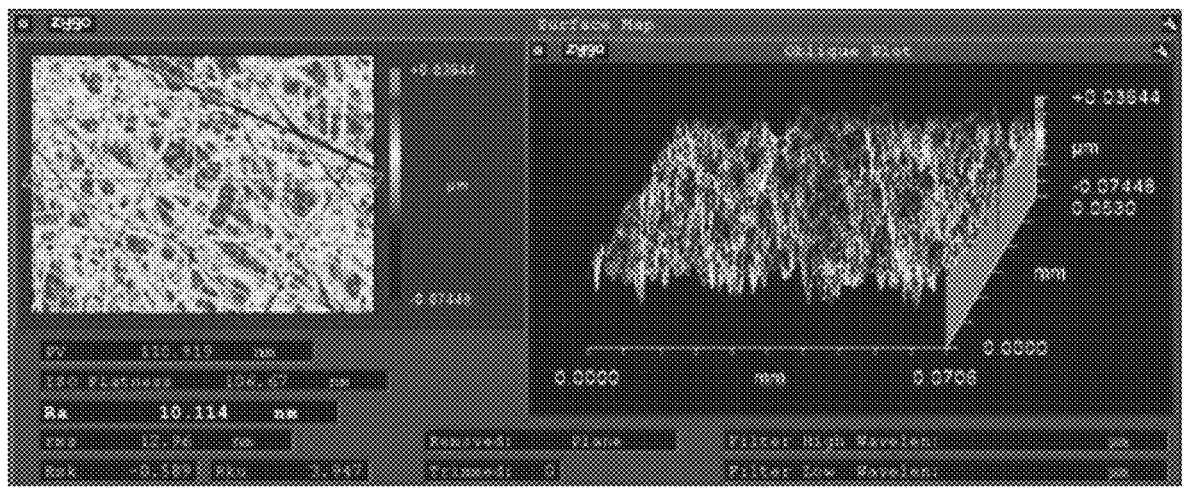
FIG. 4 illustrates a profile of sapphire before polishing by the composite abrasive with hard core and soft shell of the first embodiment of the present invention.
Figure 5:
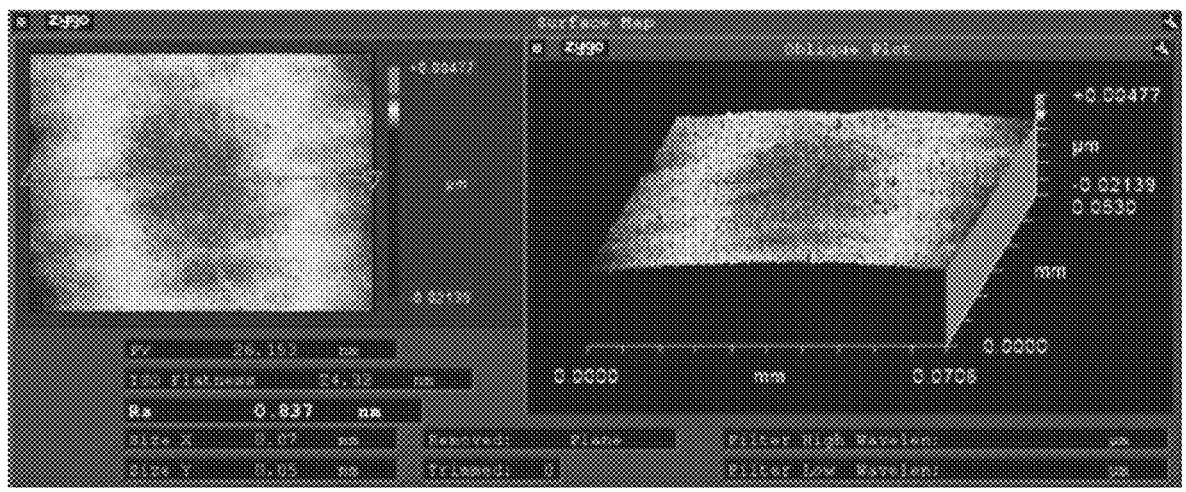
FIG. 5 illustrates a profile of sapphire polished by the composite abrasive with hard core and soft shell of the first embodiment of the present invention.

Above obtained composite abrasive with hard core and soft shell is applied in semisolidification flexible polishing tools to mechano-chemical polish sapphire wafer to obtain a sub-nanometer surface finish quality with Ra 0.8 nm, the before and after of the manufacturing are figured in FIG. 4 and FIG. 5.

The Second Embodiment (1) preparing 200 mL of magnesium nitrate solution with concentration of 0.2 mol/L by solving magnesium nitrate in deionized water;
(2) putting 2 g of W0.5 aluminum oxide abrasive into the magnesium nitrate solution;
(3) ultrasonic dispersing the material of step (2) for 10 minutes to obtain stable emulsion;
(4) the emulsion is reflux hydrolyzed in a constant temperature bath of 60° C. for 24 hours;
(5) the material of step (4) is vacuum filtered, the obtained solid is washed by distilled water for 5 times and washed by absolute ethyl alcohol for 3 times in turn.
(6) drying the solid of step (5) in 40° C. for 24 hours to obtain the composite abrasive with hard core and soft shell, as figured in FIG. 1, the composite abrasive comprising aluminum oxide abrasive core with grain diameter 0.5 μm and a soft magnesium oxide shell with thickness about 20 nm, the grain size of the magnesium oxide of the shell is about 8 nm.

Above obtained composite abrasive with hard core and soft shell is applied in semisolidification flexible polishing tools to mechano-chemical polish sapphire wafer, the surface roughness Ra of the polished sapphire is 0.6 nm.

Figure 6:
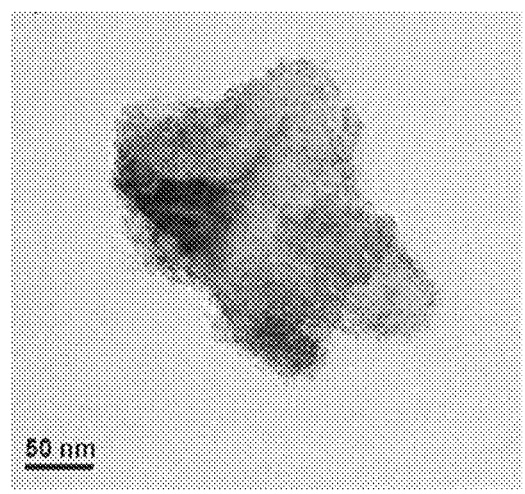
FIG. 6 illustrates a transmission electron microscope of the composite abrasive with hard core and soft shell of the third embodiment of the present invention.

The Third Embodiment (1) preparing 250 mL of ferrous sulfate solution with concentration of 0.2 mol/L by solving ferrous sulfate in deionized water;
(2) putting 5 g of W0.25 cubic boron nitride abrasive into the ferrous sulfate solution;
(3) ultrasonic dispersing the material of step (2) for 15 minutes to obtain stable emulsion;
(4) the emulsion is reflux hydrolyzed in a constant temperature bath of 85° C. for 36 hours;
(5) the material of step (4) is vacuum filtered, the obtained solid is washed by distilled water for 5 times and washed by absolute ethyl alcohol for 3 times in turn.
(6) drying the solid of step (5) in 45° C. for 20 hours to obtain the composite abrasive with hard core and soft shell, as figured in FIG. 1 and FIG. 6, the composite abrasive comprising cubic boron nitride abrasive core with grain diameter 0.25 μm and a soft ferrous sulfate shell with thickness about 15 nm, the grain size of the ferrous sulfate of the shell is about 5 nm.

Above obtained composite abrasive with hard core and soft shell is applied in semisolidification flexible polishing tools to mechano-chemical polish sapphire wafer, the surface roughness Ra of the polished sapphire is 0.4 nm.

The Fourth Embodiment (1) preparing 200 mL of cerous nitrate solution with concentration of 0.5 mol/L by solving cerous nitrate in deionized water;
(2) putting 10 g of W0.5 boron carbide into the cerous nitrate solution;
(3) ultrasonic dispersing the material of step (2) for 10 minutes to obtain stable emulsion;
(4) the emulsion is reflux hydrolyzed in a constant temperature bath of 70° C. for 54 hours;
(5) the material of step (4) is vacuum filtered, the obtained solid is washed by distilled water for 5 times and washed by absolute ethyl alcohol for 3 times in turn.
(6) drying the solid of step (5) in 45° C. for 20 hours to obtain the composite abrasive with hard core and soft shell, as figured in FIG. 1, the composite abrasive comprising boron carbide abrasive core with grain diameter 0.5 μm and a soft cerium oxide shell with thickness about 60 nm, the grain size of the cerium oxide of the shell is about 15 nm.

Above obtained composite abrasive with hard core and soft shell is applied in semisolidification flexible polishing tools to mechano-chemical polish sapphire wafer, the surface roughness Ra of the polished sapphire is 0.9 nm.

The Fifth Embodiment (1) preparing 300 mL of stannic chloride solution with concentration of 1 mol/L by solving stannic chloride in deionized water;
(2) putting 6 g of W1 silicon carbide into the stannic chloride solution;
(3) ultrasonic dispersing the material of step (2) for 10 minutes to obtain stable emulsion;
(4) the emulsion is reflux hydrolyzed in a constant temperature bath of 60° C. for 16 hours;
(5) the material of step (4) is vacuum filtered, the obtained solid is washed by distilled water for 5 times and washed by absolute ethyl alcohol for 3 times in turn.
(6) drying the solid of step (5) in 40° C. for 30 hours to obtain the composite abrasive with hard core and soft shell, as figured in FIG. 1, the composite abrasive comprising silicon carbide abrasive core with grain diameter 1 μm and a soft stannic oxide shell with thickness about 20 nm, the grain size of the stannic oxide of the shell is about 5 nm.

Above obtained composite abrasive with hard core and soft shell is applied in semisolidification flexible polishing tools to mechano-chemical polish sapphire wafer, the surface roughness Ra of the polished sapphire is 1.3 nm.

A person skilled in this field knows that regulating the components and the parameters within the scope described hereafter can also obtain the similar technical effects to the embodiments, this kind of regulation is still within the scope of the present invention.

A composite abrasive with hard core and soft shell, comprising hard abrasive core with grain diameter in a range of 0.1~1 μm and a soft oxide shell with thickness in a range of 5~100 nm, the grain size of the oxide of the soft oxide shell is in a range of 5~20 nm.

the composite abrasive is obtained from aqueous solution of oxide inorganic salt precursor and the hard abrasive by dispersing, constant temperature reflux hydrolyzing, solid-liquid separating, washing and drying.

The hard abrasive core comprises at least one kind selected from diamond, cBN, $B_4C$, SiC and $Al_2O_3$.

The oxide comprises at least one kind selected from $SnO_2$, $CeO_2$, MgO, FeO and $Fe_2O_3$.

The inorganic salt precursor comprises at least one kind selected from chlorine salt, nitrate and sulfate.

A manufacturing method of the composite abrasive with hard core and soft shell, comprising the steps:
(1) preparing aqueous solution of oxide inorganic salt precursor with concentration of 0.1~1 mol/L by solving the oxide inorganic salt precursor in deionized water;
(2) putting hard abrasive into the aqueous solution, the mass concentration of the hard abrasive in the aqueous solution is in a range of 1~10%;
(3) ultrasonic dispersing the material of step (2) for 10~15 minutes to obtain stable emulsion;
(4) the emulsion is reflux hydrolyzed in a constant temperature of 60~90° C. for 8~72 hours; (5) the material of step (4) is solid-liquid separated, the solid is washed by distilled water and absolute ethyl alcohol;
(6) drying the solid of step (5) in 40~45° C. to obtain the composite abrasive with hard core and soft shell.

Although the present invention has been described with reference to the preferred embodiments thereof for carrying out the patent for invention, it is apparent to those skilled in the art that a variety of modifications and changes may be made without departing from the scope of the patent for invention which is intended to be defined by the appended claims.

The invention claimed is:

1. A manufacturing method of a composite abrasive with a hard abrasive core and a soft oxide shell, wherein comprising the steps: (1) preparing an aqueous solution of an oxide inorganic salt precursor with a concentration of 0.1-1 mol/L by dissolving the oxide inorganic salt precursor in deionized water, wherein an oxide of the oxide inorganic salt precursor is at least one $SnO_2$, $CeO_2$, MgO, FeO, or $Fe_2O_3$; (2) putting hard abrasive cores into the aqueous solution, wherein a mass concentration of the hard abrasive cores in the aqueous solution is in a range of 1-10%; (3) ultrasonic dispersing the material of step (2) for 10-15 minutes to obtain a stable emulsion; (4) reflux hydrolyzing the emulsion in a constant temperature of 60-90° C. for 8-72 hours; (5) solid-liquid separating the material of step (4), wherein a solid obtained from the solid-liquid separation is washed by distilled water and absolute ethyl alcohol; and (6) drying the solid of step (5) in 40-45° C. to obtain the composite abrasive with the hard abrasive core and the soft oxide shell.

2. The composite abrasive with the hard abrasive core and the soft oxide shell manufactured according to the manufacturing method of claim 1, wherein the hard abrasive core has a grain diameter in a range of 0.1-1 μm and the soft oxide shell has a thickness in a range of 5-100 nm, a grain size of an oxide of the soft oxide shell is in a range of 5-20 nm.

3. The composite abrasive with the hard abrasive core and the soft oxide shell according to claim 2, wherein the hard abrasive core comprises at least one of diamond, cBN, $B_4C$, SiC or $Al_2O_3$.

4. The composite abrasive with the hard abrasive core and the soft oxide shell according to claim 2, wherein the oxide of the soft oxide shell comprises at least one of $SnO_2$, $CeO_2$, MgO, FeO or $Fe_2O_3$.

5. The composite abrasive with the hard abrasive core and soft oxide shell according to claim 4, wherein an inorganic salt precursor of the oxide inorganic salt precursor comprises at least one of chlorine salt, nitrate or sulfate.

6. The manufacturing method according to claim 1, wherein in step (5), the material of step (4) is vacuum filtered, the solid is washed by distilled water 5 times and washed by absolute ethyl alcohol 3 times in turn.

7. The manufacturing method according to claim 1, wherein in step (6), a drying period for drying the solid of step (5) is 20-30 hours.

8. The manufacturing method according to claim 5, wherein the hard abrasive cores comprise at least one of diamonds, cBN, $B_4C$, SiC or $Al_2O_3$.

9. The manufacturing method according to claim 8, wherein an inorganic salt precursor of the oxide inorganic salt precursor comprises at least one of chlorine salt, nitrate or sulfate.

10. The manufacturing method according to claim 8, wherein in step (5), the material of step (4) is vacuum filtered, the solid is washed by distilled water 5 times and washed by absolute ethyl alcohol 3 times in turn.

11. The manufacturing method according to claim 9, wherein in step (5), the material of step (4) is vacuum filtered, the solid is washed by distilled water 5 times and washed by absolute ethyl alcohol 3 times in turn.

12. The manufacturing method according to claim 8, wherein in step (6), a drying period for drying the solid of step (5) is 20-30 hours.

13. The manufacturing method according to claim 9, wherein in step (6), a drying period for drying the solid of step (5) is 20-30 hours.

14. The manufacturing method according to claim 1, wherein the hard abrasive cores have a grain diameter in a range of 0.1-1 μm and the soft oxide shell has a thickness in a range of 5-100 nm, and a grain size of an oxide of the soft oxide shell is in a range of 5-20 nm.

15. The manufacturing method according to claim 8, wherein the hard abrasive cores have a grain diameter in a range of 0.1-1 μm and the soft oxide shell has a thickness in a range of 5-100 nm, and a grain size of an oxide of the soft oxide shell is in a range of 5-20 nm.

16. The manufacturing method according to claim 9, wherein the hard abrasive cores have a grain diameter in a range of 0.1-1 μm and the soft oxide shell has a thickness in a range of 5-100 nm, and a grain size of an oxide of the soft oxide shell is in a range of 5-20 nm.

* * * * *